United States Patent [19]
Hamann et al.

[11] 3,974,379
[45] Aug. 10, 1976

[54] ELECTROMECHANICAL TIMING PULSE GENERATOR

[75] Inventors: Walter Hamann; Thomas Maurer, both of Munich, Germany

[73] Assignee: G.A.O. Gesellschaft fur Automation und Organisation m.b.H., Germany

[22] Filed: Oct. 24, 1974

[21] Appl. No.: 517,649

[30] Foreign Application Priority Data
Oct. 30, 1973  Austria .............................. 9174/73

[52] U.S. Cl. .............................. 250/233; 250/570; 250/231 SE; 250/237 G; 356/169
[51] Int. Cl.² .......................................... G01D 5/36
[58] Field of Search .......... 250/570, 237 G, 231 SE, 250/233; 356/169; 350/273–275

[56] References Cited
UNITED STATES PATENTS

| | | | |
|---|---|---|---|
| 2,471,788 | 5/1949 | Snyder, Jr. et al. | 250/570 X |
| 3,145,250 | 8/1964 | Vargady | 356/169 |
| 3,553,469 | 1/1971 | Stutz et al. | 250/237 G |
| 3,628,038 | 12/1971 | Culver et al. | 250/233 |
| 3,693,024 | 9/1972 | Hulle et al. | 250/231 SE |

*Primary Examiner*—Walter Stolwein
*Attorney, Agent, or Firm*—McGlew and Tuttle

[57] ABSTRACT

The pulse generator comprises a rotating transparent disc having a line pattern along its circumference and which is moved past an equally spaced line pattern of a fixed disc segment. The line patterns are scanned photoelectrically and the light-dark changes are converted into corresponding electrical pulses. The rotating disc and the disc segment are formed of thin plastic sheeting, and the rotating disc has two metal discs secured to respective opposite sides thereof out of the area of the line pattern thereon. One of these discs is formed with a peripheral groove into which the disc segment, which is fixed to a base, extends and bears against the rotating disc. The line patterns are provided on the outer surfaces of the disc and disc segments, whose inner surfaces are in surface-to-surface engagement to slide on each other in the area of the patterns under a slight pressure.

4 Claims, 6 Drawing Figures

ELECTROMECHANICAL TIMING PULSE GENERATOR

The present invention relates to an electromechanical timing pulse generator whose timing signals serve to control a counter, for example, and which consists of a rotating, transparent disc having a line pattern along its circumference and of a fixed disc segment with a like line pattern, as well as of a photoelectric scanner by means of which the light-dark changes, caused when the rotating pattern moves past the fixed pattern, are converted into electrical pulses.

Such timing pulse generators are known in principle and are used in various fields of technology. In electrical balances, for example, the rectilinear displacement of the balance table is converted into a rotary motion which is used to drive the rotating disc of the timing pulse generator. The number of pulses coming from the photoelectric scanner is directly proportional to the displacement of the balance table and, consequently, to the weight. This principle is described in German Auslegeschrift No. 1,208,087. If the frequency, i.e. the number of pulses per unit of time, is determined, it is possible to directly conclude the speed of revolution, as is disclosed in German Pat. No. 723,541, for example.

To obtain an output signal well suited for evaluation, it is necessary in such timing pulse generators that the lines of the rotating disc alternately cover and uncover the intervals of the pattern of the fixed disc as completely as possible. To this end, very close tolerances, e.g. 0.01 mm and smaller, must be maintained in the pattern and during the adjustment of the rotating disc. The finer the pattern, the more difficult it is to maintain these tolerances.

To avoid any leakage of light between the two pattern carriers and, on the other hand, prevent them from being scratched, two contradictory requirements must be met: the two pattern carriers must move past one another in very close proximity, but must not come into contact with one another. The known timing pulse generators of this kind, therefore, all use thin glass discs or temperature-stable rigid plastic discs as pattern carriers.

Any warping of the freely rotating disc, even in case of temperature variations, is largely excluded, particularly if glass is used. It turns out to be disadvantageous, however, that the application of the pattern lines to the glass is very expensive, and that the timing pulse generator is highly sensitive to shock as a result of the small distance between the two pattern carriers. Furthermore, the mounting and truing of the rotating disc is difficult and susceptible to trouble. For these and other manufacturing reasons, the manufacture of such timing pulse generators is justifiable only in the case of large-series runs, but skilled personnel will always be necessary.

SUMMARY OF THE INVENTION

It is the object of the present invention to provide an electromechanical timing pulse generator of the aforementioned kind which does not have the disadvantages described and which is particularly easy to manufacture, so that it will be low-priced even if made in short runs.

The invention thus relates to an electromechanical timing pulse generator wherein the line pattern along the circumference of a rotating, transparent disc is moved past an equally spaced line pattern of a fixed disc segment, wherein the patterns are photoelectrically scanned, and wherein the light-dark changes are converted into corresponding electrical pulses.

According to the invention, both the rotating disc and the fixed disc segment are thin plastic sheets or the like, and the disc and the disc segment slide on one another, in the area of the patterns, under slight pressure.

An improvement of the invention is characterized in that the rotating disc is reinforced by metal discs 1 on each surface, which metal disc do not extend into the pattern area, that one reinforcing disc has, at the side facing the pattern disc, a circumferential step which is entered by the free end of the fixed disc segment, and that, to produce a slight support pressure between the rotating disc and the disc segment, the rotating disc and the disc segment do not lie in one plane, but the mounting plane of the disc segment is displaced in the direction of the second reinforcing disc.

It is best to apply the pattern lines to those sides of the rotating disc and of the disc segment which do not slide on each other.

Advantageously, the material for the disc and the disc segment is a film exposed to the patterns.

The invention offers a number of essential advantages. For example, the manufacture of the rotating disc and of the disc segment is limited to only few, completely uncritical operations although tolerances of 0.01 mm and less can be maintained. The film material used is inexpensive and easy to process. High resolutions, e.g. 10,000 to 15,000 pattern lines per circumference or revolution, are easily possible because, thanks to the constant and small distance between the patterns, no additional optical lens systems for parallel light are necessary. Furthermore, the timing pulse generator is insensitive to shocks, vibrations and similar disturbances and can be used even at major temperature variations.

BRIEF DESCRIPTION OF THE DRAWINGS

Further features and advantages of the invention will become apparent from the following description of an embodiment when taken in conjunction with the accompanying drawings, in which.

DESCRIPTION OF THE PREFERRED EMBODIMENT

Figure 1:
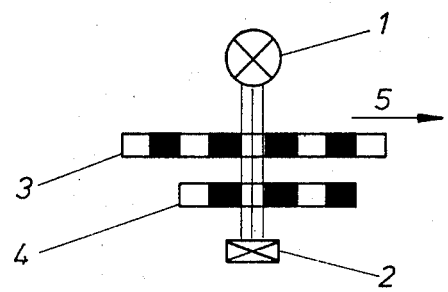
FIGS. 1 and 2 show schematically the patterns of the rotating disc and of the disc segment of the timing pulse generator in two different positions in relation to the scanner.
Figure 2:
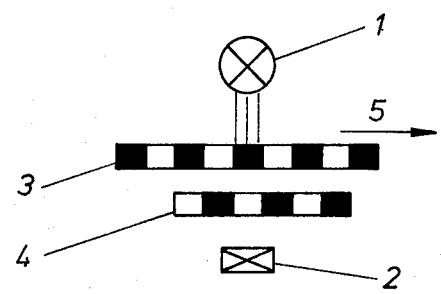

FIGS. 1 and 2 show the rotating timing pulse generator disc 3 and the fixed disc segment 4 in a schematic sectional view, with the line pattern shown enlarged. In the position of FIG. 1, the light of the light source 1 can pass through both patterns and fall on the photocell 2, while in FIG. 2, where the rotating disc 3 has traveled on in the direction of arrow 5, the passage of the light is blocked.

Figure 3:
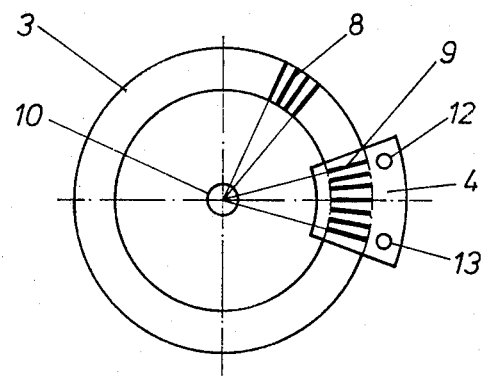
FIG. 3 is a schematic top view of the rotating disc and of the disc segment.

FIG. 3 shows the design of the rotating disc 3 with the line pattern 8, which continues along the entire circumference, and of the disc segment 4 with the line pattern 9. The punched holes 10 in the disc 3 and the holes 12 and 13 in the disc segment 4 permit the disc and the disc segment to be fixed in the housing of the timing pulse generator in such a manner that the pattern lines are in alignment.

Figure 4:
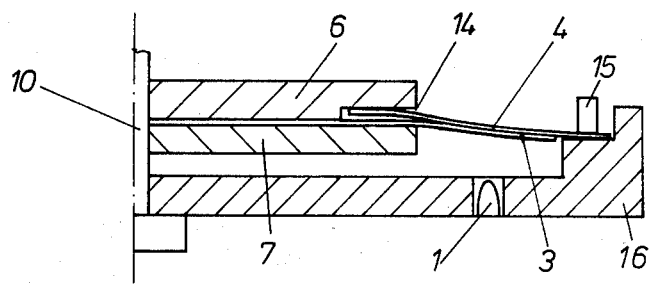
FIG. 4 is a section through one half of the timing pulse generator in accordance with the invention.

FIG. 4 shows one half of a timing pulse generator in a section. As can be seen, the rotating disc 3 and the fixed disc segment 4 are relatively thin, and they can be of plastic. The disc 3 is strengthened by a respective metal disc 6, 7 on each surface, with the area of the line pattern 8 remaining free. The disc segment 4 is secured to the lower part 16 of the housing by means of the pins 15, which extend through the punched holes 12 and 13, while its free end enters the circumferential recess 14 of the metal disc 6. Since the mounting plane of the segment 4 is displaced in relation to the plane of rotation of the disc 3, the disc 3 and the segment 4 lie upon one another under slight pre-tension. Since the pattern lines are provided on those surfaces of the about 0.1 mm thick disc 3 and of the segment 4 which do not come into contact with each other, the constant distance between the two patterns, which results from the pressure, is about 0.2 mm, which permits scanning without parallel light even with high resolution and nevertheless guarantees good results. The patterns cannot wear off because they do not touch. Because of the small mass of the disc 3 and of the disc segment 4 and thanks to the slight pre-tension, the distance between the patterns remains unchanged even in case of higher accelerations, e.g. as a result of vibrations or shocks. The sliding properties are very good if ordinary film material is used.

Utilizing the moment of resistance of the film material, the deflection of the disc 3 from its normal position by the segment 4 is chosen so that no plastic deformation occurs in the permissible temperature range (up to about +70° C), so that the geometry of the patterns is preserved. Any simple warpage of the rotating disc 3 and the resulting wobbling are compensated for by the deflection of the disc 3 from the normal position.

For the disc 3 and the segment 4, normal film material can be used. Thus, the manufacture of the two parts with the patterns is limited to few operations. As in the case of the known timing pulse generators, the pattern is drawn at an enlarged scale, e.g. at the scale of 10:1, and photographed on the film with simultaneous reduction to the scale 1:1. Following development of the film, the disc 3 and the segment 4 are stamped out and mounted. The use of films eliminates the need for any etching processes, which are necessary in the known timing pulse generators using glass discs.

Figure 5:
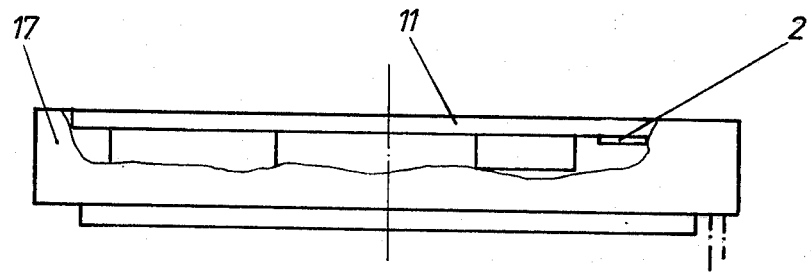
FIG. 5 is a section through the assembled timing pulse generator, with the upper part and the lower part of the housing drawn apart.
Figure 5:
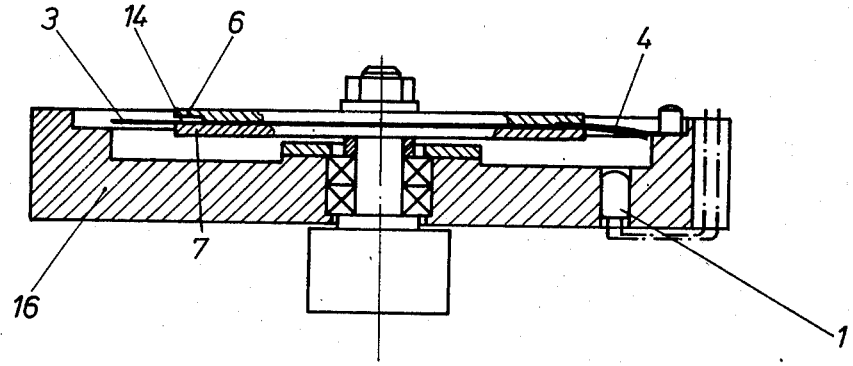
Figure 6:
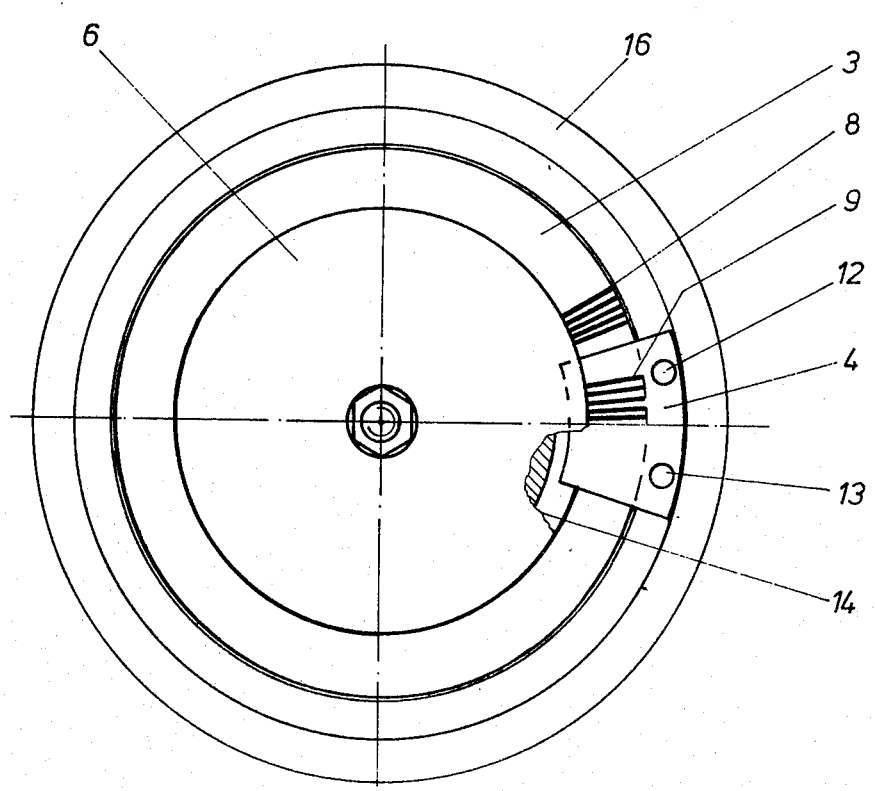
FIG. 6 is a top view of the timing pulse generator of FIG. 5.

FIG. 5 shows the assembled timing pulse generator in a section, with the lower part 16 and the upper part 17 of the housing drawn apart. The part 11 houses the electronic circuitry together with the photocell 2, and the lower housing part 16 has the lamp 1 mounted therein. FIG. 6, a top view of the lower part 16 of the housing, shows again the cooperation of disc 3 and segment 4.

What is claimed is:

1. In an electromechanical timing pulse generator of the type in which a spaced line pattern along the circumference of a rotating transparent disc is moved past an equally spaced line pattern of a fixed disc segment, with the line patterns being scanned photoelectrically and the light-dark changes being converted into corresponding electric pulses, the improvement comprising, in combination, said rotating disc and said disc segment being formed of thin flexible plastic sheeting; means mounting said disc and said disc segment in surface-to-surface engagement in the area of said patterns, to slide on each other under a slight pressure; a light source positioned to direct light through said patterns; and a photocell in the path of light passing through said patterns to produce a timing pulse output in accordance with the rotation rotating said rotation disc.

2. An electromechanical timing pulse generator according to claim 1, in which the patterns are applied to those surfaces of the rotating disc and of the disc segment which do not slide on each other.

3. An electromechanical timing pulse generator according to claim 1, in which the material used for the disc and the disc segment is a film exposed to the patterns.

4. An electromechanical timing pulse generator according to claim 1 including respective metal discs reinforcing opposite surfaces of said rotating disc and having diameters so as not extend into the pattern area; one reinforcing disc having, at its surface facing the pattern disc, a circumferential step in which there is engaged the free end of the fixed disc segment; said mounting means, to produce a slight support pressure between said rotating disc and said disc segment, displacing the mounting plane of said disc segment axially of said pattern disc in the direction of the other metal reinforcing disc.

* * * * *